United States Patent [19]

Gallusser et al.

[11] Patent Number: 4,641,811

[45] Date of Patent: Feb. 10, 1987

[54] ELECTRICAL CONNECTOR HAVING A MOLDED ANTI-DECOUPLING MECHANISM

[75] Inventors: David O. Gallusser, Oneonta; David L. Frear, Bainbridge, both of N.Y.

[73] Assignee: Allied Corp., Morristown, N.J.

[21] Appl. No.: 866,858

[22] Filed: May 23, 1986

Related U.S. Application Data

[62] Division of Ser. No. 637,184, Aug. 2, 1984, Pat. No. 4,548,458.

[51] Int. Cl.[4] .......... B29C 39/34

[52] U.S. Cl. .......... 249/122; 249/184; 425/116; 425/DIG. 34

[58] Field of Search .......... 425/110, 116, 117, 577, 425/DIG. 10, DIG. 34; 249/122, 123, 184, 186; 339/89 R, 89 M

[56] References Cited

U.S. PATENT DOCUMENTS

| | | | |
|---|---|---|---|
| 1,931,587 | 10/1933 | McConnell | 249/186 |
| 2,890,490 | 6/1959 | Morin | 249/184 |
| 3,559,249 | 2/1971 | Patton | 249/184 |

*Primary Examiner*—Willard E. Hoag

*Attorney, Agent, or Firm*—C. D. Lacina

[57] ABSTRACT

A spring member (40) is integrally molded to a radial flange (36) of a coupling nut (30), the spring member including a detent tooth (42) and having one end thereof being formed into the flange and the other end free to flex radially inward and outward to engage successive ratchet teeth (14) around the outer periphery of a plug shell (12) to which the coupling nut is rotatably mounted.

3 Claims, 9 Drawing Figures

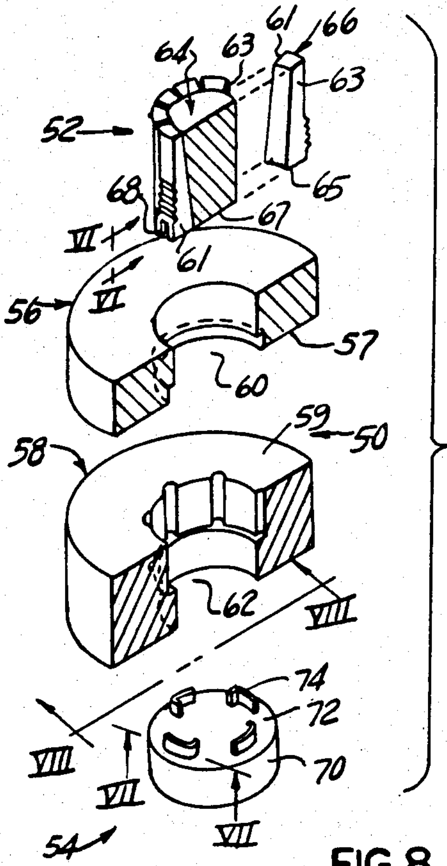
FIG. 5
FIG. 7
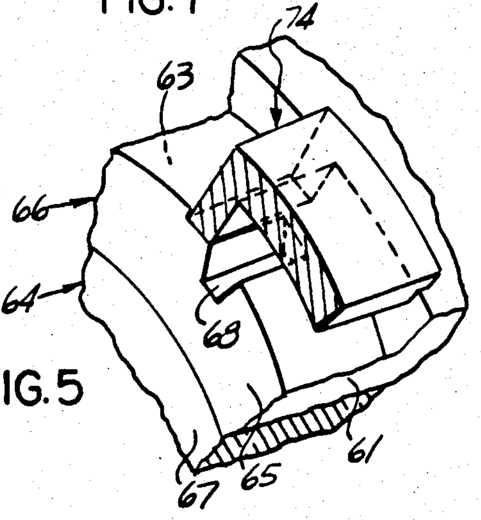
FIG. 6
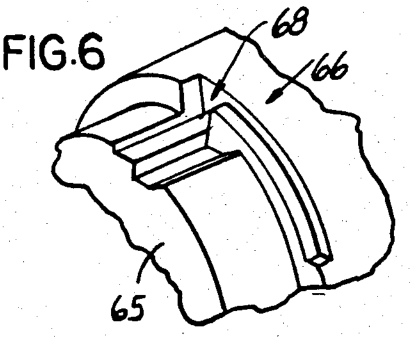
FIG. 8
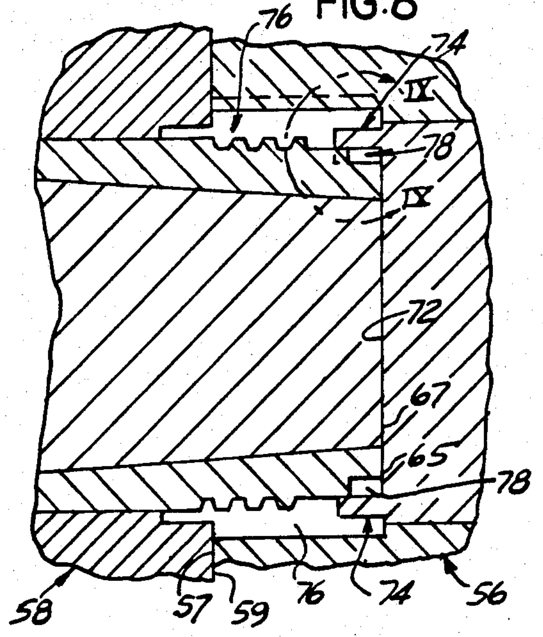
FIG. 9
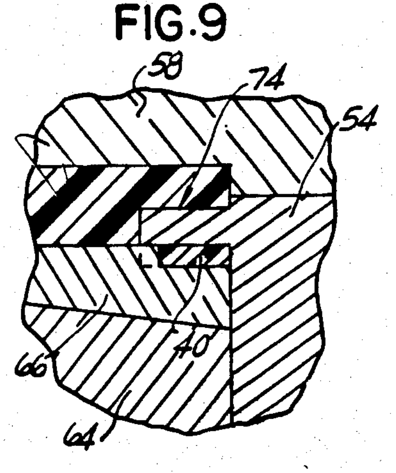

ELECTRICAL CONNECTOR HAVING A MOLDED ANTI-DECOUPLING MECHANISM

This application is a division of application Ser. No. 637,184, filed Aug. 2, 1984, now U.S. Pat. No. 4,548,458, and related to application Ser. No. 756,415, filed July 18, 1985.

This invention relates to an electrical connector including means integrally molded to a coupling nut thereof for resisting relative rotation therebetween.

An electrical connector assembly is comprised of a pair of separate shells each carrying contacts therewithin with the contacts in one shell being mateable with the contacts in the other shell when the shells are connected together by a coupling nut. The coupling nut comprises a cylindrical body and a radial flange and is generally mounted to one of the shells by the flange thereof being captivated for rotation against an annular shoulder extending radially outward from the shell. To prevent unwanted decoupling of the connector assembly, means for resisting rotation of the coupling nut relative to the shell are provided. In U.S. Pat. No. 4,109,990 issuing Aug. 29, 1978 to Waldron and entitled "Electrical Connector Assembly Having Anti-Decoupling Mechanism" a separate metal spring is mounted to the inner wall of the coupling nut. While suitable for the purposes intended, a disadvantage of this approach is that a separate member is needed and wear between metal connector parts could present a problem. In U.S. Pat. No. 4,152,039 issuing May 1, 1979 to Shah and entitled "Non-Decoupling Electrical Connector", a continuous, multi-supported, ring member is integrally molded to the coupling nut so as to define a plurality of spaced spring sections each having their opposite ends fixed at the supports. Radial flexure of adjacent spring section mid-spans could cause the plastic to crack at the common support due to severe horizontal strains.

This invention provides an anti-decoupling arrangement that eliminates the need for installing an extra piece in the coupling nut of an electrical connector to resist unwanted rotation therebetween and utilizes suitable plastics to reduce wear and increase the life and effectiveness of the anti-decoupling arrangement.

In accord with this invention, a spring finger is integrally molded into the coupling nut and characterized by the spring finger having one end thereof fixed to a radial flange of the nut and the other end thereof free to deflect radially inward and outward relative to the flange. Further a mold apparatus is provided for accomplishing the steps of integrally molding the spring finger with the coupling nut.

An advantage of the integral cantilever beam type spring finger is maintenance of rotation resistance without adverse effects of horizontal shear strains.

Another advantage of this invention is combining the spring finger with the flange whereby to minimize the outside diameter required of a coupling nut.

Reference will now be made to the accompanying drawings in which:

FIG. 5 is an exploded view showing an apparatus for molding the coupling nut.

FIG. 6 is an enlarged view taken along lines VI—VI of FIG. 5 showing a mold core segment having a relief portion on its periphery.

FIG. 7 is a partially assembled view of a pair of mold cores taken along lines VII—VII in FIG. 5 with the mold core segment cooperating with a blade for forming the spring member.

FIG. 8 is an enlarged view in section of the molding apparatus taken along lines VIII—VIII of FIG. 5, when assembled, and forming a pair of cavities for molding the coupling nut.

FIG. 9 is an enlarged view taken along lines IX—IX of FIG. 8, showing the coupling nut when molded therein.

Figure 1:
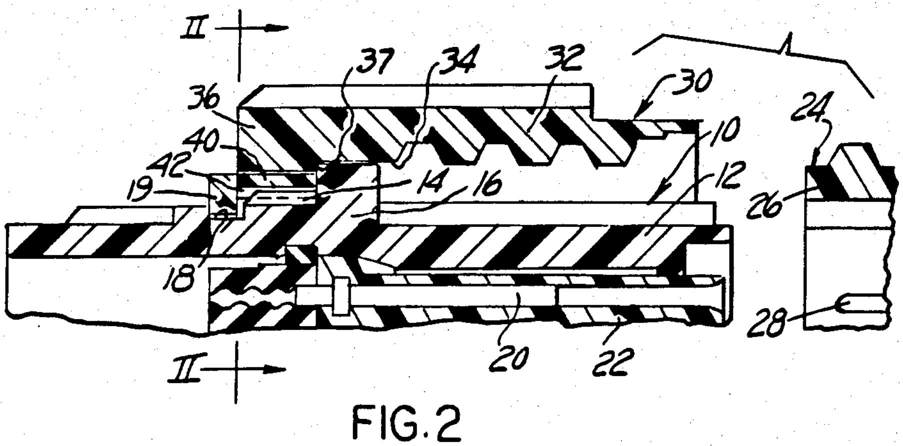
FIG. 1 is a diagrammatic view in cross section of an electrical connector assembly embodying the principles of the invention.

Referring now to the drawings, FIG. 1 shows an electrical connector assembly comprising a plug connector 10 carrying a socket contact 20, a receptacle connector 24 carrying a pin contact 28, and a coupling nut 30 captivated for rotation to the plug for connecting to the receptacle whereby to draw the connectors together and the pin and socket contacts into mated relation.

The plug connector 10 comprises a generally cylindrical shell 12 and includes on its outer periphery a plurality of ratchet teeth 14, an annular shoulder 16 extending radially outward therefrom, and an annular groove 18 extending radially inward therefrom. The socket contact 20 is carried in a dielectric insert 22 mounted within the shell.

The receptacle connector 24 comprises a generally cylindrical shell 26 and carries the pin contact 28 in a dielectric insert (not shown). The receptacle shell is sized to receive the plug shell during mating and has thread on its outer periphery for connecting with internal thread on the coupling nut.

Although each shell is preferably comprised of a plastic material, conventional shells comprised of metal would also be suitable. Further, the pin and socket contacts could be other than shown.

The coupling nut 30 is comprised of a plastic material and comprises a generally cylindrical body 32 having thread on its inner wall 34 and a radial flange 36 extending radially inward therefrom, the radial flange defining a circumferential wall 38 that circumposes the peaks of the ratchet teeth and an end wall 37 which abuts the annular shoulder 16. Integrally molded with the radial flange is a spring member in the form of a finger 40 which has a detent tooth 42 thereon for engaging respective of the ratchet teeth 14 whereby to resist unwanted relative rotation between the coupling nut and plug shell.

A snap ring 19 is received in the annular groove 18 whereby to rotatably captivate the radial flange 36 adjacent to the annular shoulder 16.

Figure 2:
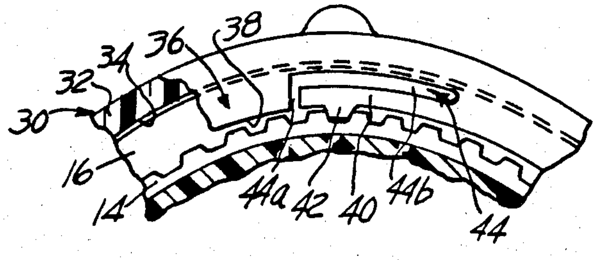
FIG. 2 is a partial end view taken in section along lines II—II in FIG. 1.

FIG. 2 is an end view of the connector showing the coupling nut 30 mounted to the plug shell 12 and detail of the radial flange 36 with the spring member 40. The radial flange includes an L-shaped slot 44 comprising a radial slot **44*a* communicating with an arcuate slot 44*b* whereby to define a cantilever type spring member having one end portion integrally molded to the flange and the other end portion free to flex radially inward and outward as a result of the detent tooth 42 being driven against the ratchet teeth 14 by an external torque being placed on the coupling nut. The radial flange 36 and the arcuate slot 44***b*, respectively, define the length and limit the radial deflection of the spring member.

The radial slot 44*a* extends radially outward from the circumferential wall 38 and to its terminus at a location inward therefrom and the arcuate slot 44*b* extends from the terminus and around the flange. Preferably, arcuate slot 44*b* subtends an arc of approximately 30°–45°. The inner wall 34 of the coupling nut body clearance fits about the outer periphery of the annular shoulder 16 and the circumferential wall 38 of the radial flange, which includes the spring finger 40, clearance fits about the peaks of the ratchet teeth. The detent tooth 42 extends radially inward from the circumferential wall 38 for a snug engagement between adjacent of the ratchet teeth. Flanks on the teeth are shallow or steep relative to an imaginary radius drawn from the axis and serve to increase or decrease rotation resistance. For rotation, a user must apply a torque which forces the teeth together and cams the spring finger radially upward and outward and into the next tooth valley.

Figure 3:
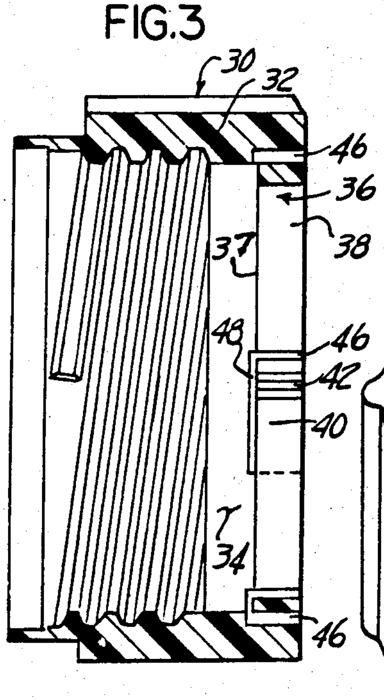
FIG. 3 is a longitudinal section of a coupling nut from the assembly shown in FIG. 1.

FIG. 3 shows the coupling nut 30 in section and including equiangularly spaced spring fingers 40 being formed integrally with the radial flange 36. An axial gap 48 and a radial gap 46, respectively, allow the spring finger to flex independently of the radial flange 36 and the coupling nut body 32.

Figure 4:
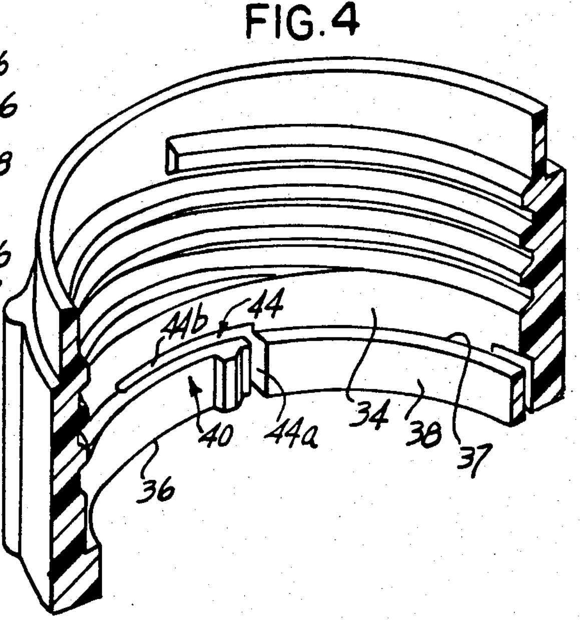
FIG. 4 is an isometric cut-away view of the coupling nut and detail of a spring finger integrally molded therewith.

FIG. 4 shows a perspective view of the coupling nut.

FIG. 5 shows an apparatus 50, cut in half, for integrally molding the spring member into the radial flange of the coupling nut, the apparatus being assembled coaxially along a primary axis and comprising a pair of mold cores 52, 54 and a pair of mold plates 56, 58 with the mold plates having, respectively, cooperating stepped passages 60, 62 for receiving the mold cores therewithin.

A front mold core 52 comprises a frusto-conical core body 64 having an axial front face 65 encircled by a plurality of radially removable arcuate mold segments 66, each of the segments having two radial faces 61, 63, an axial front face 67, and thread form 69 on its outer periphery. When the segments 66 are assembled about the core body 64, the radial faces of adjacent mold segments are abutting, the respective axial front faces 65, 67 are disposed in a common plane perpendicular to the primary axis, and the thread forms 69 combine to define a continuous helical thread. The outer periphery of the mold segments combine to define the interior diameters of the coupling nut 30. One or more of the mold segments 66, such as the one shown in detail in FIG. 6, include a relief groove 68 for forming the detent tooth 42 on the spring finger.

A rear mold core 54 comprises a cylindrical core body 70 having an axial forward face 72 and a plurality of blades 74, each of the blades 74 being L-shaped in cross-section and extending perpendicularly forward from the forward face 72.

A front mold plate 56 has a front face 57 and includes the stepped passage 60 extending centrally therethrough, the diameters of the stepped passage forming the forward outer periphery of the coupling nut.

A rear mold plate 58 has a front face 59 and includes the stepped passage 62 extending centrally therethrough, the diameters of the stepped passage forming the rearward outer periphery of the coupling nut.

FIG. 6 shows detail of one mold segment 66 and detail of the relief groove 68 on its outer periphery for molding the spring finger. The relief groove is sized to receive the blade fixed thereabout.

FIG. 7 shows detail of the assembly of the mold cores 52, 54 whereby one arcuate mold segment 66, which includes the relief groove 68 on its outer periphery for molding the spring finger, has a blade 74 disposed thereabout.

FIG. 8 shows the mold cores 52, 54 assembled within the stepped passages 60, 62 of the mold plates 56, 58 whereby to form annular cavities 76, 78 for molding the coupling nut therein. The mold segments 66, and frustoconical core body 64, respectively, have their like axial front faces 65, 67 disposed in abutment against the axial front face 72 of the rear core body 70 and the blades 74 from the rear core 54 fit about the relief groove 68 on the arcuate mold segment of the front core 52 whereby to define the mold cavity 76 for forming the spring fingers 40. The mold plates 56, 58 are abutting and clearance fit about the front and rear cores whereby to define the mold cavity 78 for forming the coupling nut.

FIG. 9 is an enlarged view of the mold core arrangement and a portion of the coupling nut 30 with the spring member 40 formed therein.

While many plastic materials are suitable, those which provide wear resistance, such as polyetherimid or polyamidimid would be preferred.

To accomplish the molding of the coupling nut having the integral spring finger, the mold cores are positioned into abutment so that the blade 74 is confronting the relief groove 68, the mold plates 56, 58 are fitted about the mold cores 52, 54 so that the front and rear mold cores are received in the stepped passages 60, 62 of the front and rear mold plates and the front faces are abutted, and plastic is injected into annular cavities 76, 78 formed between the mold cores and the stepped passages.

We claim:

1. An apparatus for molding an electrical connector coupling nut of the type comprising a radially deflectable finger integrally molded thereto, the apparatus comprising:

a pair of cylindrical mold cores, each said core having a central axis and a respective front face thereof adapted to be brought into abutting relation, one said mold core comprising a cylindrical body having a relief groove adjacent to its front face, and the other said mold core including an arcuate blade that extends longitudinally from its front face to circumpose the relief groove whereby to define a first annular cavity, and means including a pair of mold plates for receiving said pair of mold cores, said receiving means comprising each said mold plate including a stepped cylindrical passage, the inner and outer diameter of each passage step being, respectively, substantially equal to and greater than the outer diameter of the one said mold core and the other said mold core whereby to clearance fit the mold cores therewithin and define a second annular cavity, the first annular cavity forming the spring finger and the second annular cavity forming the coupling nut.

2. The apparatus as recited in claim 1, wherein the one said mold core comprises a plurality of annular segments each having a pair of radial faces and a portion of said front face with said plurality of segments being arranged to form the cylindrical body with like said front faces being disposed in a common plane.

3. The apparatus as recited in claim 2, wherein each of several annular mold segments includes a relief groove and the other said mold core includes a corresponding number of arcuate blades that circumpose the respective relief portions.

* * * * *